Patented May 10, 1938

2,117,087

UNITED STATES PATENT OFFICE 2,117,087

PROTEIN-CARBOHYDRATE FERTILIZER

Richard Formhals, Berlin-Grunau, Germany, assignor to Chemische Fabrik Grünau, Landshoff & Meyer Akt. Ges., Berlin-Grunau, Germany, a company of Germany No Drawing. Application October 2, 1935, Serial No. 43,217. In Germany May 27, 1932

13 Claims. (Cl. 71—22)

The invention concerns a fertilizer, which has a favorable effect on the soil bacteria in the same degree as natural fertilizers, stable and liquid manure. In contrast to the natural fertilizers, the new fertilizer has the advantage of being always equally efficient and not being able to spread pathogenic germs.

The fertilizer comprises, according to the invention, a mixture of chemically degraded protein cleavage products and water soluble carbohydrates.

The application of protein containing waste for fertilization has already been suggested. It has been found advantageous to disintegrate the proteins before using them as fertilizer in order to make them more readily assimilable. It has also been observed that proteins cause an increase in the action of soil bacteria. Also the application of soluble carbohydrates as fertilizers has been suggested several times; especially there have been numerous attempts to use sulfite waste liquor for purposes of fertilization. But the same favorable results cannot be obtained either with proteins or with sulfite waste liquor alone, as are obtained with the mixed fertilizer described in the invention.

The present invention is based on the discovery that the favorable effects of proteins as fertilizer can be increased by a multiple when they are applied mixed with water soluble carbohydrates. For this purpose it is suitable to use, as proteins, waste that has been converted by chemical degradation into water soluble protein cleavage products. The degradation of the protein is best done by the action of acid or alkali or by boiling with water, preferably under pressure. The protein cleavage products chemically obtained by one of the methods described, are distinguished by the complete lack of foul smelling degradation products as compared with the products obtained by the action of bacteria or enzymes. Furthermore, any protein, especially protein containing waste of any kind, can be degraded, whereas not all the proteins can be degraded by the action of enzymes. In addition, homogeneity of the protein cleavage products is better guaranteed with chemically degraded proteins than with those decomposed by the action of enzymes.

The fertilizer consisting of a mixture of chemically degraded protein cleavage products and of water soluble carbohydrates shows, according to my invention, as already mentioned, a fertilizing activity which exceeds by far the efficiency of the components. The new mixture is apparently able to have a greater stimulating action on the soil bacteria than the protein cleavage products or the water soluble carbohydrates alone. This can be proved by soaking a given amount of peat-dust once with an aqueous solution of protein cleavage products, another time with an aqueous solution of water soluble carbohydrates and finally with a solution comprising protein cleavage products and water soluble carbohydrates. The three specimens are then stored at a covered place. The temperature of the third specimen is, after a couple of days, 4½° higher than that of the adjacent soil, whereas the first two specimens do not show a remarkable rise of temperature. This rise in temperature must have been caused by the action of bacteria stimulated by the new mixture.

As already mentioned protein cleavage products of various origins are to be taken into consideration. Leather waste, as e. g. obtained in sole manufacturing, and slaughter house waste are particularly valuable raw materials. The present invention allows one to make use of such waste otherwise of little value, in the form of a new, especially efficient fertilizer.

Cheap waste will preferably be used as water soluble carbohydrates, as e. g. sulfite waste liquor, or the last uncrystallizable molasses residues. Since sulfite waste liquor represents an almost useless byproduct, it is to be considered as an important advantage of the present invention that it succeeds in producing a valuable fertilizer from a waste which is otherwise removed with such great difficulties.

The mixtures of chemically degraded protein cleavage products and of water soluble carbohydrates can, owing to their solubility in water, easily and homogeneously be distributed in the soil or on a carrier. Porous materials of any kind can be taken into consideration, such as e. g. straw, chaff, saw dust, leaf litter and other similar products. Peat dust is particularly suitable as a porous carrier.

It is advantageous that the new fertilizer be as nearly as possible neutral in reaction and, in the event that sulfite waste liquor be used, ammonia may be employed to neutralize the excess of acid. When applying protein cleavage products degraded by the action of alkali, one can neutralize the excess of alkali by an acid, e. g. phosphoric acid. The new fertilizer comprises in this way further nutritious matter for the plants. But also independently from this, more or less large amounts of the usual inorganic fertilizers, such as potassium salts, phosphates, niter, and calcium carbonate, may be mixed with the new fertilizer.

As to the relative amounts of the constituents it has been found that particularly good results are obtained when 1-2 parts of protein cleavage products are used with about 1 part of sulfite waste liquor or molasses. But minor deviations from this proportion do not influence the results considerably.

When the new fertilizer is used in connection with an absorbing carrier, the concentration of the plant nutrient, being adapted to the optimal growth conditions of the plants to be fertilized, can be chosen in such a way that the products obtained may be applied directly as nutrient media. Thus it is possible to manufacture different types of soil in agreement with the special requirements of fruit farming. Furthermore, a considerable saving of fertilizers is gained by placing into plant holes the mixed fertilizer prepared according to the invention by absorption in an absorbing carrier.

A very suitable way of preparing the new fertilizer is as follows: 100 kg. leather, skin and other protein containing waste is dissolved in a boiling mixture of 15 kg. about 50% caustic alkali solution and 200 l. water. More or less caustic alkali must be used according to the type of raw material, varying especialy with its water content. The solution is filtered, if necessary, neutralized with phosphoric acid and concentrated to have a specific gravity of 1.2 (about 5% N). 35 kg. of this solution are mixed with 15-35 kg. of sulfite waste liquor.

This solution when being used directly for fertilization must be diluted with 3-100 times its amount of water, according to the cultural value of the soil and the requirements of the plants to be fertilized. If it is intended to produce a material suitable as a nutrient medium, 1 kg. of absorbing substance, e. g. peat dust, is soaked with 3 l. of the 20 times diluted solution. Besides the quoted organic absorbing materials, calcium carbonate may be used as a carrier.

The following fertilization experiments demonstrate the extraordinary efficiency of the new fertilizer:

*Experiment I*

22 g. protein cleavage products, dissolved in 400 ccm. water and neutralized with 2.4 g. ammonia, are added to 100 g. peat dust.

*Experiment II*

22 g. protein cleavage products
4 g. sulfite waste liquor
2.4 g. ammonia
400 ml. water
100 g. peat dust

*Experiment III*

22 g. protein cleavage products
8 g. sulfite waste liquor
2.4 g. ammonia
400 ml. water
100 g. peat dust

*Experiment IV*

22 g. protein cleavage products
12 g. sulfite waste liquor
2.4 g. ammonia
400 ml. water
100 g. peat dust

*Experiment V*

22 g. protein cleavage products
16 g. sulfite waste liquor
2.4 g. ammonia
400 ml. water
100 g. peat dust

*Experiment VI*

22 g. protein cleavage products
20 g. sulfite waste liquor
2.4 g. ammonia
400 ml. water
100 g. peat dust Mixtures I—VI were placed into the plant holes on nonfertilized sandy soil. The holes were covered with sand, and savoy cabbage shoots of equal size were set into them.

After 98 days of growth the following results were found:

| Experiment | Weight of the savoy cabbage plant |
|---|---|
| | Grams |
| I | 365 |
| II | 440 |
| III | 1280 |
| IV | 1125 |
| V | 740 |
| VI | 695 |

In this case a ratio of 2 parts protein cleavage products to 1 part sulfite waste liquor gave optimal efficiency, while important increases in plant growth resulted when the content of carbohydrate material was between about 18% and about 100% of the content of the chemically degraded protein cleavage product.

When the fertilizing solution is applied as such and not after absorption in peat dust, best results are obtained with a ratio of 1 part protein cleavage products to 1 part sulfite waste liquor. Sulfite waste liquor, when used as such for fertilizing purposes, can be exhausted with difficulties only. Particularly, it is not a suitable medium for bacteria.

The superiority of the new fertilizer over the known inorganic fertilizing salts with and without the addition of sulfite waste liquor can be seen from the following experiments, in all of which an amount of fertilizer was used, per square meter of previously nonfertilized sandy soil, to add 11.0 g. N, 7.5 g. $K_2O$ and 6.7 g. $P_2O_5$. Savoy cabbage plants were taken as experimental plants.

*Experiment A*

Inorganic salts, exclusively, such as ammonium phosphate, ammonium sulphate, and potassium sulphate were taken as fertilizer.

*Experiment B*

Sulfite waste liquor was used in addition to the previously mentioned salts for fertilization.

*Experiment C*

Protein cleavage products were used in addition to the previously mentioned fertilizing salts.

*Experiment D*

The fertilization was done with a mixture of protein cleavage products and of sulfite waste liquor according to the invention.

The result of these experiments was as follows:

| Experiment | Total harvest | Largest savoy cabbage head |
|---|---|---|
| | Kilograms | Kilogram |
| A | 2.420 | 0.770 |
| B | 2.210 | 0.880 |
| C | 2.590 | 0.960 |
| D | 3.450 | 1.570 |

When the same experiments were carried out replacing sulfite waste liquor by molasses and savoy cabbage by yellow turnips, the following results were found:

| Experiment | Total harvest turnips |
|---|---|
| | Kilograms |
| $A_1$ | 2.45 |
| $B_1$ | 2.75 |
| $C_1$ | 2.25 |
| $D_1$ | 4.30 |

It will be seen from these experiments that the efficiency of the fertilizer prepared according to my invention is not only considerably greater than that of the inorganic fertilizing salts, but that it is also much more favorable than that of such fertilizers as contain protein cleavage products or sulfite waste liquor alone.

I claim:

1. A fertilizer having as essential fertilizing constituents water soluble chemically degraded protein cleavage product and water soluble carbohydrate, the content of carbohydrate being between approximately 18% and approximately 100% of the content of degraded protein cleavage product.

2. A fertilizer comprising a mixture of water soluble chemically degraded protein cleavage product and water soluble carbohydrate, in which the ratio of the quantity of protein cleavage product to the quantity of carbohydrate is from approximately 1:1 to approximately 2:1.

3. A fertilizer in the form of a substantially neutral aqueous solution including as essential fertilizing constituents dissolved chemically degraded protein cleavage product and dissolved carbohydrate in approximately equal proportions.

4. A fertilizer comprising an absorbent carrier material impregnated with a solution of water soluble chemically degraded protein cleavage product and water soluble carbohydrate in which the content of carbohydrate is between approximately 18% and approximately 100% of the content of protein cleavage product.

5. A fertilizer comprising peat dust impregnated with a solution of water soluble chemically degraded protein cleavage product and water soluble carbohydrate in which the content of carbohydrate is between approximately 18% and 100% of the content of protein cleavage product.

6. A fertilizer as described in claim 4, in which the solution includes a substantial content of inorganic fertilizing salt.

7. A fertilizer as described in claim 1, including a substantial content of inorganic fertilizing salt.

8. The fertilizer of claim 1 in which the constituents are substantially neutralized.

9. The fertilizer of claim 1 in which said protein product consists of chemically degraded leather waste.

10. The fertilizer of claim 1 in which said carbohydrate consists of sulfite waste liquor.

11. The fertilizer of claim 1 in which said carbohydrate consists of molasses.

12. The fertilizer of claim 1 in which said carbohydrate consists of sulfite waste liquor substantially neutralized with ammonia.

13. The method of preparing a fertilizer composition which comprises dissolving protein-containing material in a caustic alkali solution, neutralizing with phosphoric acid, concentrating the neutralized solution to a specific gravity in the neighborhood of 1.2, mixing a quantity of sulfite waste liquor with from about 1 to 2 times as much by weight of the concentrate and diluting the mixture with from 3 to 100 times as much water.

RICHARD FORMHALS.